United States Patent [19]

Sich

[11] Patent Number: 5,113,694

[45] Date of Patent: May 19, 1992

[54] MODIFIED PRESSURE REGULATOR VALVE FOR SINGLE CAR TESTING DEVICE

[75] Inventor: Gary M. Sich, Irwin, Pa.

[73] Assignee: Westinghouse Air Brake Company, Wilmerding, Pa.

[21] Appl. No.: 705,053

[22] Filed: May 23, 1991

[51] Int. Cl.⁵ ............................................. G01M 3/02
[52] U.S. Cl. .................................. 73/121; 73/40.5 R
[58] Field of Search .................... 73/129, 121, 40.5 R; 303/86, 81; 188/1.11

[56] References Cited

U.S. PATENT DOCUMENTS 4,440,015  4/1984  Hann ................................. 73/121 X
4,755,803  7/1988  Shockley et al. ................. 73/121 X

OTHER PUBLICATIONS

WABCO Instruction Pamphlet No. 5039-4, Sup. 1, Single Car Testing Device, Apr. 1991.

WABCO Operation and Maintenance Manual, 4207-6, S.3.1, SA-9 Independent Brake Valve, Sep. 1988.

WABCO Fluid Power Catalogue SC-800, Pneumatic Pressure Control Valves, Oct., 1986.

*Primary Examiner*—Jerry W. Myracle
*Attorney, Agent, or Firm*—G. J. Falce

[57] ABSTRACT

A conversion kit for modifying a single car test device regulator valve, such as to provide an adjustable maximum test operating pressure in one position of the regulator valve handle, and a reduced operating test pressure in another handle position of the regulator valve that is less than the maximum test operating pressure by a predetermined amount, in order to satisfy the requirements of a new test procedure mandated by the Association of American Railroads for more accurately utilizing the results of a leakage test as an indication of the operating condition of the car control valve during the single car test.

4 Claims, 3 Drawing Sheets

MODIFIED PRESSURE REGULATOR VALVE FOR SINGLE CAR TESTING DEVICE

BACKGROUND OF THE INVENTION

The present invention relates to a single car test device with which railway car brake systems are checked to assure proper operation without requiring removal of any of the brake system components from the car. More particularly, the invention is directed to a modified regulating valve of the single car test device for achieving more comprehensive test results.

Existing single car test devices are relatively simple in design and low in cost, employing a regulator valve that can be adjusted to supply a predetermined test operating pressure for charging the brake equipment when the outlet coupling of the single car test device is connected to a railway car brake pipe. The regulator valve typically used in this application is known commercially as the N-1 Reducing Valve. The brake pipe is charged from a source of compressed air through an operator's multi-position rotary valve that is situated between the regulating valve and the outlet coupling to the brake pipe. The different rotary valve positions provide different preselected rates at which the test operating pressure is supplied to the brake pipe from a source of compressed air and exhausted to atmosphere, in accordance with the prescribed test code. In a lap position of the rotary valve, this charging and venting of the brake pipe are both cut off.

Also employed in the existing single car test devices is a FLOWRATOR meter that is situated between the rotary valve and outlet coupling to provide a visual indication of the rate of air flow in the brake pipe when a bypass cock associated with the FLOWRATOR meter is closed. While the FLOWRATOR meter reading can be used to ascertain system leakage, only the leakage attributed to the brake pipe can be identified specifically by making a leakage test with the car control valve cut out. This is due to the fact that while the regulating valve of the single car test device has a pressure maintaining capability at its one full pressure setting, this pressure maintaining capability is nullified when the brake pipe pressure is reduced or the operator's valve is moved to lap position during a test, since the rotary valve cuts off the regulating valve from the car brake pipe in this lap position.

The Association of American Railroads has recently specified a change to the conventional single car test procedure, which in one important instance requires that a 10 psi maintained reduction of the test operating pressure reduction be made below the selected maximum test operating pressure setting. The specific purpose of this test is to better detect undesirable leakage into the car brake cylinder, which is critical to assuring proper brake control valve operation. It has been proposed by others to add to the capability of the single car test device to provide such a second pre-set pressure maintained 10 psi below the first pre-set test operating pressure by adding a by-pass line including a second regulating valve and a cut-out cock. By pre-setting this second regulating valve 10 psi below the main regulating valve pressure setting and opening the by-pass cut-out cock, with the by-passed operator's valve placed in lap position No. 3, the 10 psi maintained pressure reduction can be achieved.

This method for modifying the single car test device to provide this dual pressure maintaining requirement entails considerable additional valves, cocks, fittings, and piping, thus making the single car test device more complex to operate and maintain, more cumbersome to handle and considerably more expensive in both initial cost and maintenance, as well as likely adding to the incidence of breakdown.

SUMMARY OF THE INVENTION

It is the object of the present invention to provide a conversion kit for modifying the existing single car test device regulator valve to accommodate the new A.A.R. mandated test procedure for detecting undesired leakage into the car brake cylinder.

In accordance with this objective, there is provided for a single car test device regulator valve a conversion kit comprising a support bracket fixed to the regulator valve body, a handle mounting bracket adjustably fixed relative to the support bracket and having a bore therein, a handle member pivotally connected to the handle mounting bracket for rotation between an inactive position and an active position, the handle member including a pair of limit stops each engageable with the handle mounting bracket in an inactive and an active handle position to define the handle positions and an operating end having a cam surface, a pusher pin disposed in the handle mounting bracket bore for axial displacement therein, one end of the pusher pin being engageable with the cam surface and the other end engageable with the regulator valve self-lapping valve assembly, which in the inactive handle position is spaced-apart from the pusher pin, whereby the self-lapping valve assembly assumes a first axial position in which the regulator valve regulating spring is adjusted to provide a test operating pressure at a predetermined value of generally 10 psi less than a desired maximum test operating pressure, threaded means for adjusting the fixed position of the handle mounting bracket to vary the displacement of the pusher pin by said cam surface, which in the active handle position is engaged with and displaces the pusher pin to re-position the self-lapping valve assembly from its first position to a second position in which the adjusted tension of the regulator valve spring is automatically increased to provide the maximum test operating pressure.

BRIEF DESCRIPTION OF THE DRAWINGS

This object and other attendant advantages of the invention will become apparent from the following more detailed explanation when taken in conjunction with the accompanying drawings in which.

DESCRIPTION AND OPERATION

Figure 1:
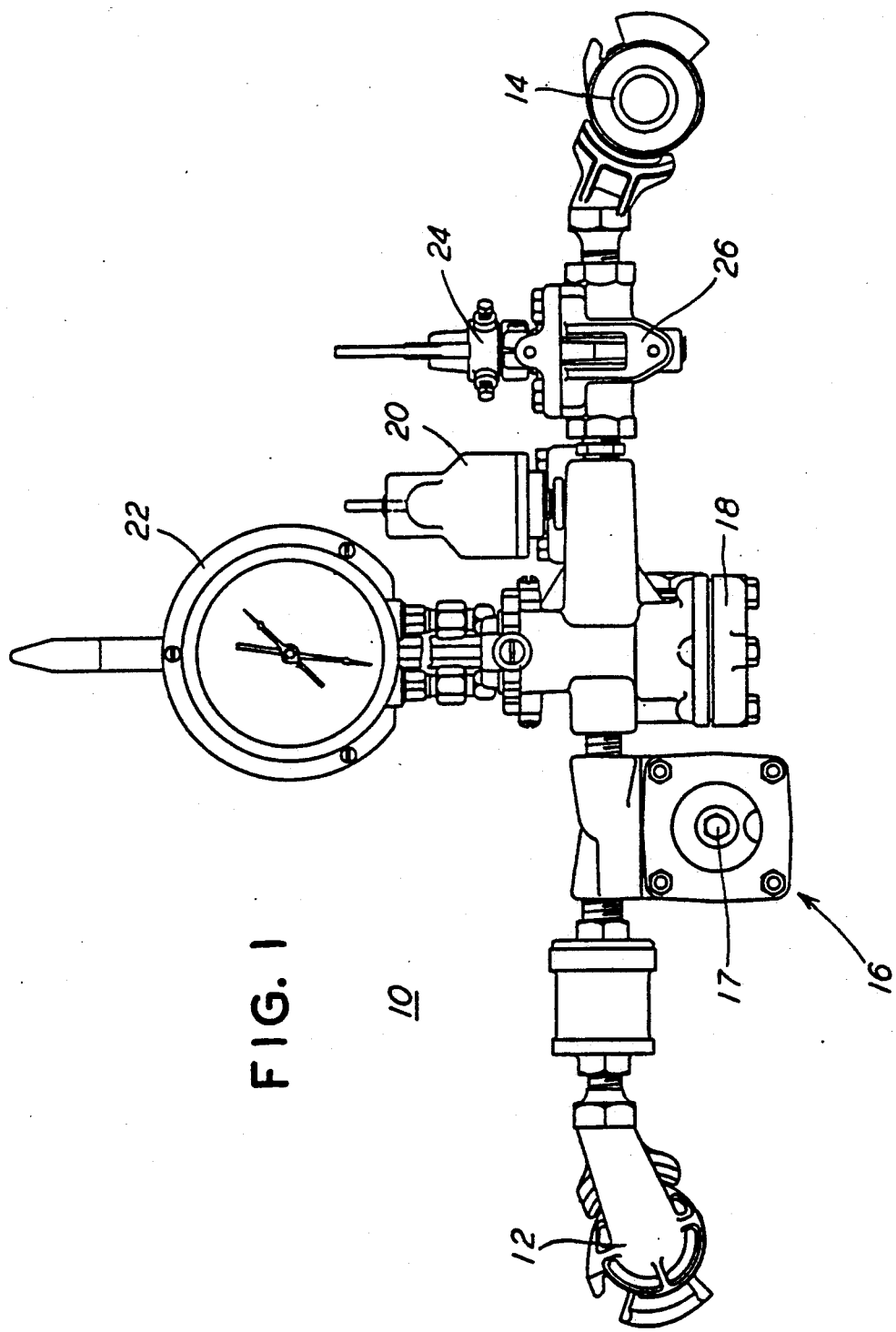
FIG. 1 shows an outline view of a conventional, single car test device.

Referring to FIG. 1, there is shown a single car test device 10 that is typically employed to routinely perform a general check of the condition of a railway car brake system, without requiring dis-assembly or removal of any of the brake system components from the car. Such test devices have been well-known in the railroad industry for many years. The single car test device includes a hose coupling 12 at one end for connection to a supply pipe (not shown) via which a source of compressed air is delivered, and a hose coupling 14 at the opposite end for connection to the brake pipe of a railway car (also not shown). A pressure maintaining regulator valve 16 includes an adjusting screw 17 for setting a desired test operating pressure to be supplied for charging the car brake pipe. This regulated delivery pressure from the regulator valve is supplied by way of an operator's rotary valve 18 having a plurality of operating positions No. 1 to No. 6. In handle position No. 1, a fast charging rate is provided, and in position No. 2 a slow charging rate is selected. In positions Nos. 4-6, different restricted rates of exhausting air pressure from the brake pipe may be selected. In position No. 3, both charging and exhausting of the brake pipe air is terminated, with the supply and exhaust ports cut off. Between the operator's valve 18 and hose coupling 14 is a quick release valve 20 for venting the brake pipe air unrestricted in bypass of the operator's valve 18. Also provided is an air gage 22 that monitors the brake pipe pressure and a bypass cock 24 and a FLOWRATOR valve 26 that provides a visual check of the leakage existing in the car brake system.

Regulator valve 16 employs a self-lapping valve assembly that maintains a delivery pressure at its outlet port according to the selected setting of adjusting screw 17. While regulator valve 16 has the ability to maintain the delivery pressure at the pressure setting for which screw 17 is adjusted, due to the self-lapping feature of the valve assembly, it will be appreciated that when the operator's valve 18 is placed in lap position No. 3, flow communication between regulator valve 18 and the car brake pipe is interrupted. This effectively nullifies the pressure maintaining ability of regulator valve 18, resulting in the problem alluded to heretofore, with respect to making it difficult to detect leakage into the car brake cylinder.

Figure 2:
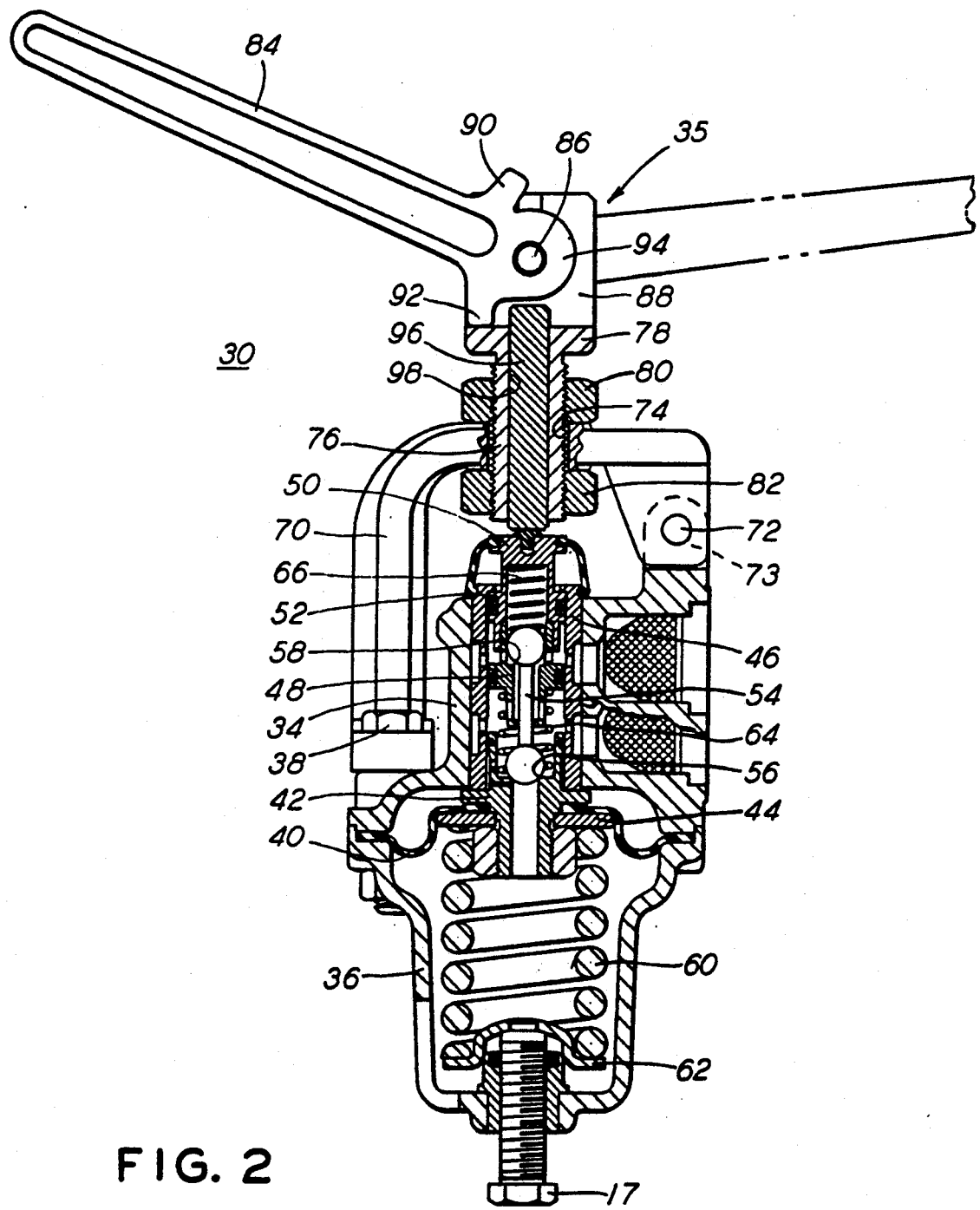
FIG. 2 is a sectional assembly view of the single car test device regulating valve, as modified in accordance with the present invention.
Figure 3:
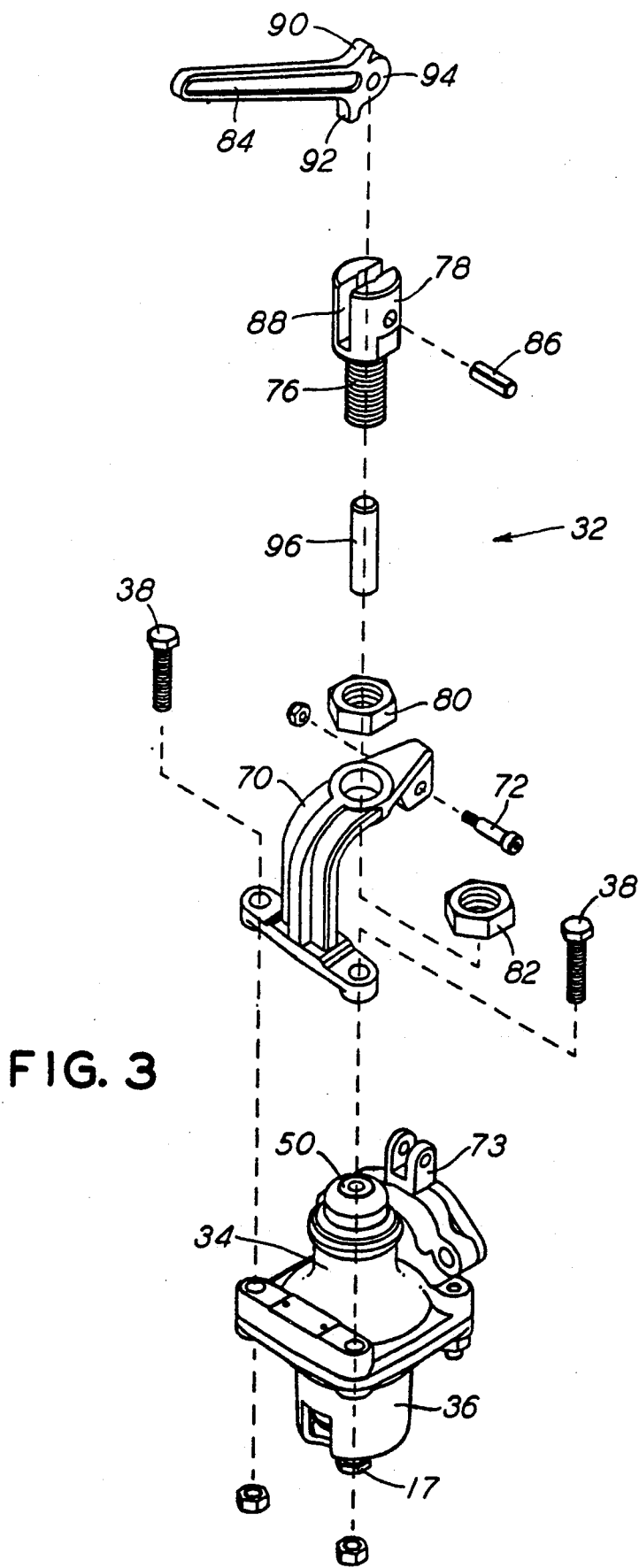
FIG. 3 is an exploded view showing the various parts of a conversion kit with which to modify the existing single car test device, in accordance with the present invention.

In FIGS. 2 and 3 of the drawings is shown a modified regulator valve 30 that is similar to regulator valve 16, except for the addition of a new conversion kit 32. When this modified regulator valve 30 is employed in single car test device 10 in place of existing regulator valve 16, a first maximum test operating pressure is established and maintained in one handle position that differs from a second reduced test operating pressure that is established and maintained in a second handle position. This eliminates the need for a second, separate regulating valve otherwise required to obtain two distinct pressure maintained settings.

The regulator valve body comprises a valve housing 34 and a main spring housing 36 that are secured together by cap screws 38. Clamped between housings 34 and 36 is the outer periphery of a diaphragm member 40 that is clamped at its inner periphery between an exhaust valve member 42 and a piston backing plate 44. Exhaust valve member 42 is disposed in the bore of a bushing 46 in housing 34, so as to be axially movable. Also disposed in the bore of bushing 46 is a supply valve member 48 that is axially movable independently of exhaust valve member 42. An operating end 50 of supply valve member 48 projects from the bore of bushing 46 a distance limited by engagement of a shoulder 52 of supply valve member 48 with an inturned flange at one end of the bushing 46. A valve element 54 is arranged between the exhaust and inlet valve members, so as to engage and disengage respective exhaust and supply valve seats 56 and 58. The aforementioned diaphragm member 40, exhaust valve member 42 and supply valve member 48 comprise a self-lapping valve assembly.

In the absence of air, as shown, a main regulating spring 60 acting between backing plate 44 and a spring retainer 62 in housing 36 forces a shoulder 64 of exhaust valve member 42 into engagement with the other end of bushing 46 to limit movement of exhaust valve member 42 in one direction. A spring 64 that is lighter than main spring 60 acts between the exhaust and supply valve members to effect engagement of shoulder 55 with its limit stop. Another spring 66 that is lighter than spring 64 acts between a inner bearing surface of supply valve member 48 and valve element 54 to effect closure of the exhaust valve. The axial spacing of the active parts of valve element 54 and the distance between the exhaust and supply valve seats in the shown limit positions of the exhaust and supply valve members is such that valve element 54 is disengaged from supply valve seat 58. Adjusting screw 17 acting through spring retainer 62 provides a means of adjusting the tension of main regulating spring 60.

Conversion kit 32 includes a support bracket 70 that is mounted on the regulator valve body by cap screws 38 and by a shoulder bolt 72 that secures the support bracket to an existing bifurcated mounting lug 73 of valve housing 34. Bracket 70 is formed with an opening 74 through which the threaded portion 76 of a handle mounting bracket 78 passes, this handle bracket 78 being secured by jam nuts 80 and 82 that are carried on threaded portion 76 so as to engage opposing surfaces of main bracket 70. These jam nuts 80 and 82 provide a means of adjusting the vertical position of handle bracket 78 relative to main bracket 70 for a purpose hereinafter discussed. An actuating handle 84 is pivotally connected by a roll pin 86 to handle bracket 78 within a cross slot 88. Protruding ears 90 and 92 on either side of the handle adjacent roll pin 86 are adapted to engage the base of slot 88 to limit handle rotation between an inactive position, as shown, and an active position, as shown in phantom. An operating end 94 of handle 84 is generally circular in shape but formed about the axis of pivot pin 86 so as to be eccentric thereto. In this manner, the operating end of handle 84 provides a cam surface by means of which the upper end of a pusher pin 96, that is guidably disposed in a bore 98 of handle bracket 78, may be axially displaced to in turn change the axial position of the regulator valve supply valve member 50 and ultimately the position of the self-lapping valve assembly.

In setting up regulator valve 30 for the desired maximum and reduced test operating pressures, in accordance with the new single car test procedure mandated by the Association of American Railroads, jam nuts 80, 82 are initially adjusted to assure that a gap exists between the handle operating end 94 and pusher pin 96, when the handle is in its inactive position, as shown. This allows the self-lapping valve assembly to be located in its upper-most position under the influence of spring 60. By adjusting the tension of spring 60 via screw 17, with the self-lapping valve assembly in a lap condition, the desired reduced test operating pressure, to be established in this inactive position of handle member 84, is pre-set.

The desired maximum test operating pressure may be set by rotating handle member 84 to its active position, in which the operating end 94 is effective to displace pusher pin 96 in a downward direction. In that pusher pin 96 acts on supply valve member 50 of the self-lapping valve assembly, this displacement of pusher pin 96 has the effect of re-positioning the self-lapping valve assembly within bushing 4 from its upper-most position to a lower position. This in turn automatically increases the tension of spring 60 without changing the pre-adjusted setting of screw 17.

Since the range of rotation of handle member 84 is fixed, as is the throw of the cam surface comprising the operating end of the handle member, final adjustment of the pressure setting in this active position of the handle, in order to compensate for manufacturing tolerances and wear, for example, is obtained by raising or lowering the handle member.

Loosening jam nut 82 and tightening jam nut 80 on the threaded portion 76 of handle bracket 78 raises the handle bracket and thus the vertical position of handle operating end 94 relative to pusher pin 96. Loosening jam nut 80 and tightening jam nut 82, on the other hand, lowers the vertical position of the handle operating end. Such fine adjustment results in precise control of the self-lapping valve assembly position and consequently the tension of spring 60 in the active handle position to assure the accuracy of the desired difference between the maximum and reduced test operating pressures.

With regulator valve 30 installed in a single car test device 1, such as that shown in FIG. 1, to replace the existing regulator valve 16, and adjusted as described, a maximum test operating pressure is obtained in the activated position of handle 84 and a predetermined reduced test operating pressure is obtained in the inactive position of handle 84.

With regulator valve handle 84 in its active position and operator's valve 18 in position No. 1, the car brake pipe is charged from a source of compressed air. This air flows via the regulator valve inlet port and open supply valve to the regulating valve outlet port. A feedback passage in the exhaust valve member 42 connects this pressure to the side of diaphragm member 40 opposite main spring 60. As the pressure builds up on diaphragm 40, spring 60 compresses until valve element 54, which follows the deflection of diaphragm member 40 and exhaust valve member 42, engages valve seat 58 to terminate further supply of air to the brake pipe via the regulating valve outlet port. With both the supply valve and exhaust valve now closed, a lap condition is obtained in which the maximum test operating pressure is maintained against leakage and overcharge.

In the event the regulated test operating pressure decreases, for example, the reduced pressure acting on diaphragm member 40 will allow main spring 60, acting through exhaust valve member 44 and valve element 54, to open the supply valve until the desired maximum test operating pressure is again realized.

In the event the regulated test operating pressure increases, for example, the pressure increase effective on diaphragm member 40 will compress main spring 60 to cause exhaust valve member 42 and seat 56 to pull away from valve element 54. With the exhaust valve thus open, the excess test operating pressure is released via the exhaust port in spring housing 36 until the effective test operating pressure supplied to the brake pipe is reduced to the maximum that the regulator valve is set to maintain. When this occurs, the self-lapping valve assembly will again be in its lap position.

It will now be appreciated that in conducting the single car test in accordance with the new test procedure mandated by the Association of American Railroads, the operator's valve 18, in FIG. 1, is moved from charge position No. 1, in which the car brake pipe is charged to the maximum test operating pressure provided, with the regulator valve handle in its active position.

A system leakage test is conducted by closing the FLOWRATOR by-pass cock 24 and observing the position of the float in the FLOWRATOR tube. The flow rate provides an indication of the system leakage in release position of the car control valve.

With the FLOWRATOR bypass cock 24 opened, the operator's valve 18 is returned to position No. 1 to recharge the car brake pipe in accordance with the maximum test operating pressure provided by regulator valve 30. Next, a minimum service reduction of brake pipe pressure is made by moving operator's valve 18 to position 4 until the brake pipe pressure drops 3 psi below the maximum test operating pressure, then the operator's valve 18 is moved to lap position No. 3 to terminate the reduction. The car brake pipe pressure should continue to drop to within a range of from 4–10 psi of the maximum test operating pressure, due to the car control valve quick service activity. Once this brake pipe pressure drop stops following termination of quick service activity, the regulator valve handle 84 is flipped directly from its active position to its inactive position in which a reduced test operating pressure is provided that is set 10 psi less than the maximum test operating pressure. The operator's valve 18 is now moved from lap position to position No. 1 in which full charging communication is established between regulator valve 30 and the car brake pipe to maintain the brake pipe pressure at the reduced test operating pressure. This will in effect stabilize the car brake pipe pressure against leakage to assure that the car control valve moves to lap position, which heretofore could not be assured.

Again closing the FLOWRATOR cock 24, the FLOWRATOR 26 float position is observed to detect the flow rate as an indication of the system leakage with the car control valve in lap position following application of the car brakes. Assuming this flow rate is substantially the same as the flow rate noted when making the system leakage test with the car control valve in release position, it can be reasonably assured that the detected leakage is not in the control valve itself. However, if the aforementioned flow rate with the car control valve in lap position following a brake application is significantly greater than the flow rate observed with the car control valve in release position during the system leakage test, the greater leakage can be reasonably attributed to a control valve malfunction.

In accordance with the foregoing, the modification of the single car test device regulator valve 16, by the addition of conversion kit 32 of the present invention, results in a single regulator valve capable of maintaining the two required adjustable pressures, which differ by a fixed, predetermined amount regardless of the desired maximum test operating pressure, as required to achieve the foregoing test procedure without requiring an additional regulator valve, cut-out cock, associated piping and fittings, etc., as heretofore proposed, in order to more accurately assess the operating condition of a car control valve during the single car test.

I claim:

1. A conversion kit for modifying an air pressure regulator valve in a single car testing device to enable said regulator valve to selectively deliver a second pre-set test operating pressure in addition to a first pre-set test operating pressure, wherein said test device further includes an operator's rotary valve for charging and venting air under pressure to the brake pipe of a railway car at different flow rates, said regulator valve being connected between a source of air under pressure and said operator's rotary valve and having a self-lapping valve assembly and an adjustable helical regulating spring acting thereon to supply air under pressure from said source to said operator's rotary valve at the selected one of said first and second pre-set test operating pressures, said conversion kit comprising:

(a) a support bracket fixed to the body of said regulator valve;

(b) a handle mounting bracket adjustably fixed to said support bracket and having a bore therein coaxially aligned with said regulating spring;

(c) a handle member pivotally connected to said handle mounting bracket for pivotal rotation between an active position and an inactive position, said handle member comprising:
   1. an operating end having a cam surface;
   2. a pair of limit stops each engageable with said handle mounting bracket in a respective one of said active and inactive handle positions to define said handle positions;

(d) a pusher pin disposed in said bore of said handle mounting bracket for axial displacement therein, said pusher pin having one end engageable with said cam surface of said handle member and another end engageable with said self-lapping valve assembly, said cam surface of said handle member in said inactive position thereof being spaced apart from said one end of said pusher pin, whereby said self-lapping valve assembly assumes a first axial position in which said regulating spring is adjusted to provide and maintain said pre-set second test operating pressure at a predetermined value of generally 10 pounds per square inch less than said first pre-set test operating pressure;

(e) threaded means for adjusting the fixed position of said handle mounting bracket relative to said support bracket to vary said displacement of said pusher pin by said cam surface, said cam surface in said active handle position displacing said pusher pin to re-position said self-lapping valve assembly from said first axial position thereof to a second axial position in which the force of said regulating spring acting on said self-lapping valve assembly is increased to provide said first pre-set test operating pressure.

2. A regulator valve conversion kit, as recited in claim 1, wherein said second test operating pressure is between 70 and 100 pounds per square inch.

3. A regulator valve conversion kit, as recited in claim 2, wherein said threaded means for adjusting the fixed position o said handle mounting bracket relative to said support bracket comprises:

(a) a hole in said support bracket;

(b) a threaded portion of said handle mounting bracket projecting through said hole; and (c) a pair of jam nuts threadedly connected to said threaded portion, respective ones of said jam nuts engaging opposite sides of said handle mounting bracket.

4. A regulating valve conversion kit, as recited in claim 3, wherein the throw of said cam surface between said active and inactive handle positions is such as to provide at least a 10 pounds per square inch differential between said first and second test operating pressures in said active and said inactive handle positions, respectively.

* * * * *